United States Patent [19]
Ito et al.

[11] Patent Number: 5,734,416
[45] Date of Patent: Mar. 31, 1998

[54] STEREOSCOPIC PICTURE DISPLAY UNIT

[75] Inventors: Toshinari Ito, Tokyo; Yoshinobu Mantani, Kyoto, both of Japan

[73] Assignees: NEC Corp., Tokyo; Nintendo Co., Ltd., Kyoto, both of Japan

[21] Appl. No.: 575,549

[22] Filed: Dec. 20, 1995

[30] Foreign Application Priority Data

Dec. 26, 1994 [JP] Japan .................. 6-337276

[51] Int. Cl.$^6$ .................................. H04N 17/18
[52] U.S. Cl. .................. 345/58; 345/51; 345/52; 345/10
[58] Field of Search .................. 348/58, 57, 56, 348/53, 744, 745, 743, 741, 747, 43, 44

[56] References Cited

U.S. PATENT DOCUMENTS

| | | | |
|---|---|---|---|
| 4,490,745 | 12/1984 | Erickson et al. | 358/250 |
| 4,523,226 | 6/1985 | Lipton et al. | 348/39 |
| 4,877,307 | 10/1989 | Kamanash | 348/56 |
| 4,922,336 | 5/1990 | Morton | 358/88 |
| 4,995,718 | 2/1991 | Jachimowicz et al. | 348/741 |
| 5,258,830 | 11/1993 | Schmidt et al. | 348/744 |
| 5,335,022 | 8/1994 | Braun et al. | 348/744 |
| 5,351,097 | 9/1994 | Brooke | 348/744 |
| 5,532,764 | 7/1996 | Itaki | 348/745 |
| 5,541,641 | 7/1996 | Shimada | 348/58 |

FOREIGN PATENT DOCUMENTS

1-171388  7/1989  Japan .

*Primary Examiner*—Tommy P. Chin
*Assistant Examiner*—Anand S. Rao
*Attorney, Agent, or Firm*—Nixon & Vanderhye

[57] ABSTRACT

In a projector, green CRT projection tubes for displaying pictures for the right and left eyes are arranged on the right and left sides with respect to a screen respectively, while a red CRT projection tube for convergence adjustment is arranged at the center. Further, the projector includes polarizing filters which are provided on respective front surfaces of the CRT projection tubes, a triple two-input one-output type selector switch, and a convergence adjusting picture signal source. In general, a right eye picture signal from a right eye picture signal source is supplied to the CRT projection tube through the selector switch, while a left eye picture signal from a left eye picture signal source is supplied to the CRT projection tube through the selector switch. At this time, the observer can visually recognize a stereoscopic monochromatic picture through polarizing glasses. In convergence adjustment, the convergence adjusting picture signal source generates a picture signal of a convergence adjustment image which is supplied to the projection tubes via the selector switch.

4 Claims, 6 Drawing Sheets

STEREOSCOPIC PICTURE DISPLAY UNIT

BACKGROUND OF THE INVENTION

1. Field of the Invention

The present invention elates to a stereoscopic picture display unit, and more particularly, it relates to a stereoscopic picture display unit for making stereoscopic picture display on a screen through a projection unit which is provided with polarizing filters.

2. Description of the Background Art

In general, display units for stereoscopic pictures are roughly classified into those of a system of supplying the right and left eyes of an observer with picture data therefor independently of each other for expressing the depth, and those of a system of allowing observation from an arbitrary viewpoint in a limited range for expressing the depth.

Figure 6:
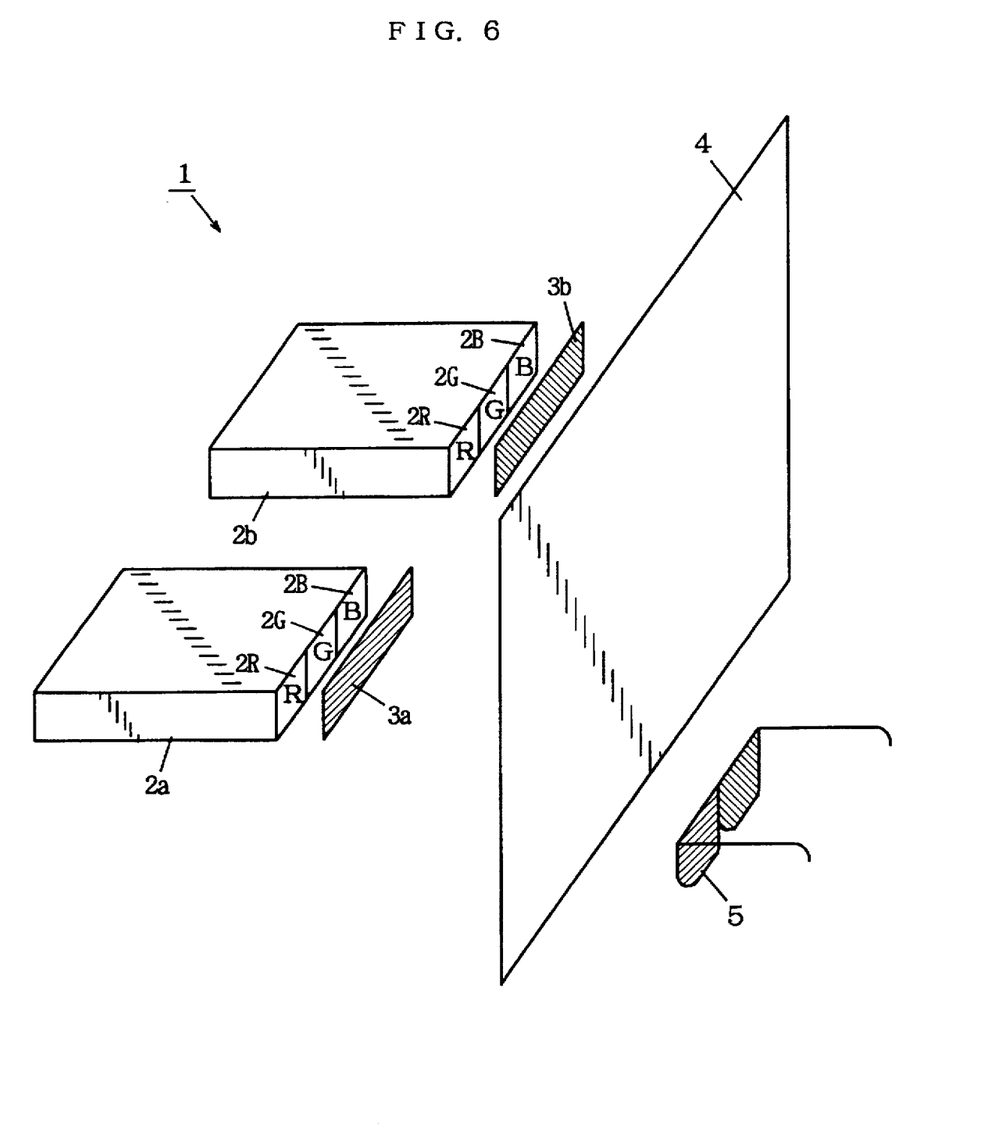
FIG. 6 is a schematic perspective view showing an example of a conventional stereoscopic picture display unit.

FIG. 6 illustrates an exemplary structure of a conventional stereoscopic picture display unit 1 employing the former system. Referring to FIG. 6, in the conventional stereoscopic picture display unit, linear polarizing plates in pairs polarizing in directions orthogonal to each other are provided in front of color projectors 2a and 2b for the left and right eyes as dedicated polarizing filters 3a and 3b respectively, and a screen 4 is arranged in front of the polarizing filters 3a and 3b (refer to Japanese Patent Laying-Open No. 1-171388, for example).

Each of the color projectors 2a and 2b for the left and right eyes is formed by a three-tube projector having cathode ray tube (CRT) projection tubes 2R, 2G and 2B for the three primary colors of red (R), green (G) and blue (B), which are combined with each other in prescribed positional relations. The CRT projection tubes 2R, 2G and 2B have red, green and blue fluorescent screens respectively in response to the projected colors.

In this conventional stereoscopic picture display unit, left and right picture signals which are generated with binocular parallax are supplied to the color projectors 2a and 2b respectively. Thus, the color projectors 2a and 2b for the left and right eyes project color pictures for the left and right eyes on the screen 4 through the polarizing filters 3a and 3b respectively. The observer wears polarizing glasses 5 employing linear polarizing plates for the right and left eyes polarizing in directions orthogonal to each other, and observes these color pictures in front of the screen 4 through the polarizing glasses 5 with binocular parallax, thereby recognizing the same as a stereoscopic picture.

The aforementioned conventional stereoscopic picture display unit 1 is structured on the premise that each of pictures for the left and right eyes is projected from the two color projectors 2a and 2b which are provided for the left and right eyes to the screen 4, thereby displaying a stereoscopic color picture. Therefore, the three CRT projection tubes 2R, 2G and 2B corresponding to each of the three primary colors must be integrated into each the color projectors 2a and 2b. Thus, the overall unit requires six CRT projection tubes in total, and hence the manufacturing cost for the unit is increased and a considerable space is required for setting the two color projectors 2a and 2b.

Further, the aforementioned conventional stereoscopic picture display unit 1 requires convergence adjustment so that the three CRT projection tubes 2R, 2G and 2B of each of the color projectors 2a and 2b for the left and right eyes project pictures on the same point of the screen 4, and also indispensably requires additional convergence adjustment of the overall unit so that the two color projectors 2a and 2b project the pictures on the point of the screen 4. Thus, such adjusting operations are complicated and time-consuming.

SUMMARY OF THE INVENTION

The present invention has been proposed in consideration of the aforementioned points, and an object thereof is to provide a stereoscopic picture display unit which can display a stereoscopic picture in a simpler structure.

Another object of the present invention is to provide a stereoscopic picture display which can accurately perform convergence adjustment of a plurality of projection units in a short time.

Still another object of the present invention is to provide a stereoscopic picture display unit which can selectively display a stereoscopic monochromatic picture and a two-dimensional color picture.

In order to attain the aforementioned objects, the stereoscopic picture display unit according to the present invention includes:

first and second projection units which emit beams of light of the same hue in response to input picture signals respectively;

a third projection unit which is aligned with the first and second projection units for emitting a beam a hue which is different from that of the beams emitted from the first and second projection units in response to an input picture signal;

first and second polarizing filters, consisting of linear polarizing plates polarizing in directions orthogonal to each other or circular polarizing plates rotating in opposite directions from each other, which are mounted on the front surfaces of the first and second projection units respectively;

a screen receiving the beams projected from the first to third projection units for displaying a picture; and a selector switch for supplying one of the first and second projection units with a left eye picture signal while supplying the other with a right eye picture signal in stereoscopic picture display, and supplying each of at least one of the first and second projection units and the third projection unit with a convergence adjusting picture signal in convergence adjustment.

According to the present invention, as hereinabove described, one of the first and second projection units is supplied with the left eye picture signal and the other one is supplied with the right eye picture signal in stereoscopic picture display, whereby a stereoscopic monochromatic picture can be obtained by observing left and right eye pictures of the same hue which are projected from the first and second-projection units on the screen through the polarizing glasses having the same polarization characteristics as the first and second polarizing filters on left and right eye portions thereof respectively. Thus, according to the present invention, a stereoscopic monochromatic picture can be obtained with a smaller number of (at least two) projection units, as compared with the conventional stereoscopic picture display unit obtaining a stereoscopic color picture with six projection units in total including three units for the left eye and three units for the right eye, whereby the unit can be formed at a low cost. When the present invention is applied to a stereoscopic picture display unit for a video game, in particular, characters of a role playing game or the like can be effectively projected/displayed as stereoscopic monochromatic pictures with a pseudo-realistic background belonging to an imaginary world rather than the real one.

According to the present invention, further, the convergence adjusting picture signal is supplied to each of at least one of the first and second projection units and the third projection unit in convergence adjustment, whereby convergence adjusting pictures of different colors can be projected on the screen. Thus, the observer can adjust the convergence while observing not superposition of convergence adjusting pictures of the same color, but superposition of convergence adjusting pictures of different colors, whereby convergence adjustment is easily enabled with high accuracy in a short time, with no requirement for skillfulness.

According to a preferred embodiment of the present invention, a convergence adjusting picture signal source is provided for generating a convergence adjusting picture signal which is supplied to each of at least one of the first and second projection units and the third projection unit through the select or switch in convergence adjustment. Thus, the convergence adjusting picture signal can be generated in the unit without separately preparing a convergence adjusting picture signal source.

According to the preferred embodiment of the present invention, further, the selector switch is formed as a three-input one-output selector switch which supplies the left or right eye picture signal supplied to one of the first and second projection units to the first and third projection units, and then switches to input the signal to the second and third projection units in convergence adjustment. Thus, the convergence adjusting picture signal source can be preferably omitted.

According to the preferred embodiment of the present invention, in addition, a color projector is provided consisting of three color projection units for projecting color pictures on the screen, so that the first polarizing filter is formed to be detachable or slidable on a front surface of a projection unit of a predetermined color among the three color projection units of the color projector as the first projection unit, the second polarizing filter is mounted on a front surface of a projection unit of the same color as the projection unit of the predetermined color, which is arranged to be adjacent to the color projector as the second projection unit, and the remaining projection units of two colors other than the projection unit of the predetermined color among the three color projection units of the color projector are employed in common as the third projection unit.

According to the afore mentioned structure of the preferred embodiment, the front surface of the projection unit of the predetermined color among the three color projection units of the color projector is covered with the detachable or slidable first polarizing filter, to be used as the first projection unit in common. Further, the second projection unit is arranged to be adjacent to the color projector, whereby the remaining two projection units of the color projector are employed in common as the third projection unit. Consequently, a monochromatic but stereoscopic picture can be displayed by supplying the left and right eye picture signals to the first projection unit of the color projector and the second projection unit which is arranged adjacently to the color projector respectively. Further, the original two-dimensional color picture can also be displayed by employing only the color projector while supplying the second projection unit with no picture signal. In addition, convergence adjustment can be performed by the remaining two projection units of the color projector and the second projection unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
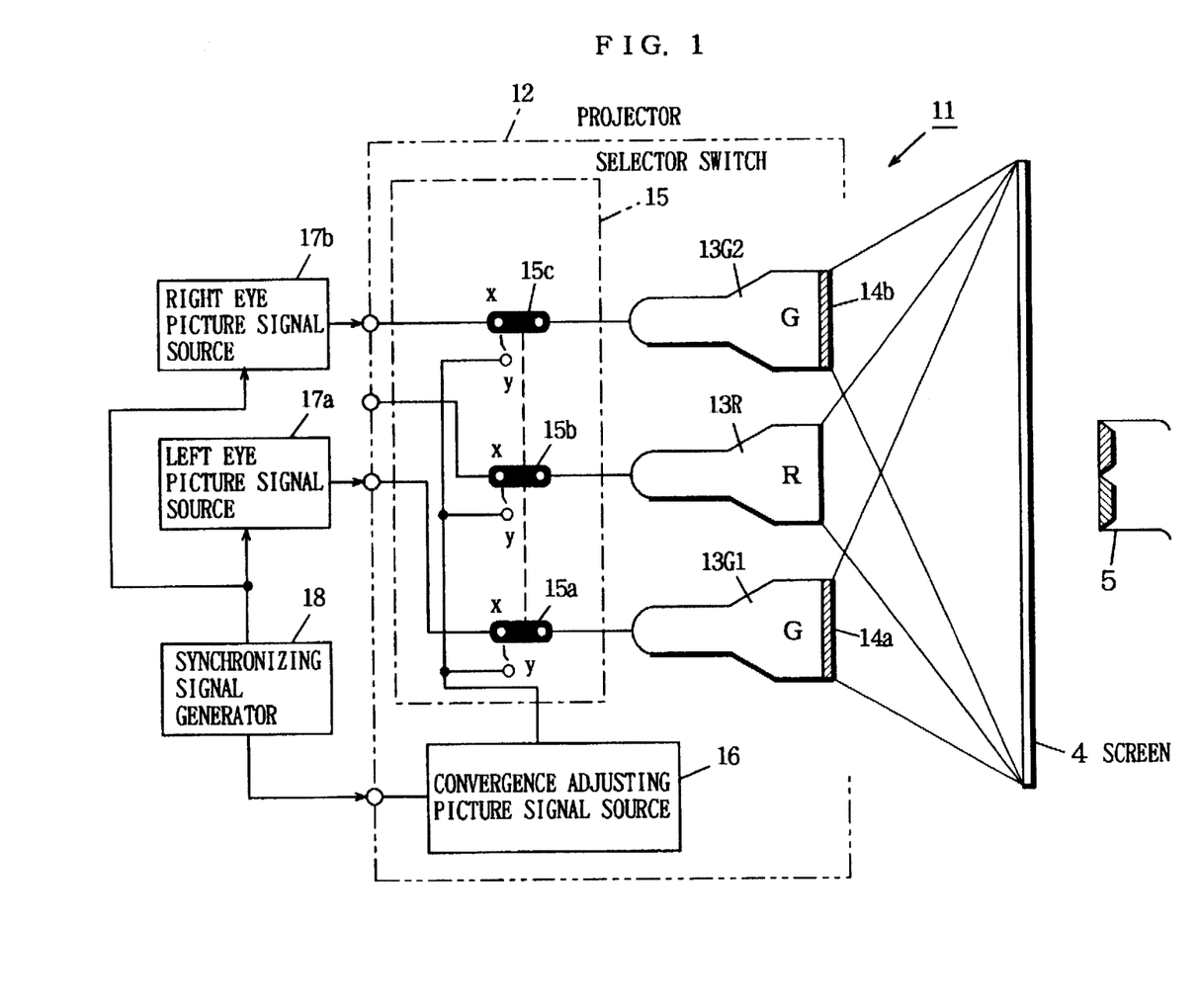
FIG. 1 is a schematic block diagram showing a unit according to an embodiment of the present invention.

Embodiments of the present invention are now described with reference to FIGS. 1 to 5. FIG. 1 is a schematic block diagram showing a stereoscopic picture display unit 11 according to an embodiment of the present invention. Referring to FIG. 1, the stereoscopic picture display unit 11 according to this embodiment consists of a projector 12 and a screen 4, for displaying a stereoscopic monochromatic picture on the screen 4 with only one three-tube projector 12.

The three-tube projector 12 includes two tubes same color and one tube of another color, which are aligned with each other. According to this embodiment, green CRT projection tubes 13G1 and 13G2 for displaying left and right eye pictures respectively are arranged on the left and right sides with respect to the screen 4, while a red CRT projection tube 13R for convergence adjustment is arranged at the center.

The projector 12 further contains polarizing filters 14a and 14b which are provided on respective front surfaces of the CRT projection tubes 13G1 and 13G2, a triple selector switch 15 consisting of two-input one-output switching elements 15a, 15b and 15c, and a convergence adjusting picture signal source 16.

The polarizing filters 14a and 14b are formed by linear polarizing plates polarizing in directions orthogonal to each other. The triple selector switch 15 is formed by the switching elements 15a, 15b and 15c having switching terminals y which are connected to an output terminal of the convergence adjusting picture signal source 16 in common, and common terminals which are connected to input terminals of the projectors 13G1, 13R and 13G2 respectively. The convergence adjusting picture signal source 16 generates a picture signal of an image, such as crosshatch pattern, for example, which is suitable for convergence adjustment.

Left and right eye picture signal sources 17a and 17b are adapted to supply the projector 12 with left and right eye picture signals respectively. The left and right eye picture signal sources 17a and 17b are formed by means generating left and right picture signals including binocular parallax or information corresponding thereto such as live picture outputs of a certain object obtained by two television cameras which are arranged with binocular parallax, a pair of video tape recorders reproducing such live picture signals, or a pair of picture memories storing picture data for stereoscopic pictures which are formed through a picture processing technique such as computer graphics, for example.

Both of these picture signal sources 17a and 17b are so formed as to transmit left and right eye picture signals at timings synchronized with synchronizing signals which are generated from a synchronizing signal generator 18. Thus, these signal sources 17a and 17b may be formed by television cameras or video tape recorders which are subjected to external synchronization, or a pair of picture memories storing left and right picture data which are read in synchronization through common addresses.

The operation of this embodiment is now described. When each of the switching elements 15a to 15c is in regular positions which is connected to switching terminals x shown in FIG. 1, left and right eye picture signals are inputted in the green CRT projection tubes 13G1 and 13G2 from the left and right eye picture signal sources 17a and 17b through the switching elements 15a and 15c respectively. However, no signal is inputted in the red CRT projection tube 13R since a switching terminal x of the switching element 15b is a null terminal.

Thus, a left eye picture is displayed by a green beam which is emitted from the green CRT projection tube 13G1, converted to linearly polarized light of a first plane of polarization by the polarizing filter 14a, and projected on the screen 4. At the same time, a right eye picture is displayed by another green beam which is emitted from the green CRT projection tube 13G2, converted to, linearly polarized light of a second plane of polarization which is orthogonal to the first plane of polarization, and projected on the screen 4.

The observer observes a picture displayed with green beams from the front of the screen 4 through polarizing glasses 5 employing linear polarizing plates polarizing in directions orthogonal to each other to recognize the left and right eye pictures with binocular parallax, thereby being able to recognizing a monochromatic (green in this embodiment) stereoscopic picture.

This is preferably applicable to the case of projecting/ displaying characters of a role playing game or the like as stereoscopic monochromatic picture's with a pseudo-realistic background belonging to an imaginary world rather than the real one for stereoscopic picture display for a video game, in particular.

Thus, the red CRT projection tube 13R which is arranged at the intermediate position between the left and right green CRT projection tubes 13G1 and 13G2 is not directly related to projection of the stereoscopic picture but remarkably contributes to convergence adjustment extremely influencing the quality of the stereoscopic picture. In such convergence adjustment, each of the switching elements 15a to 15c is switched/connected to the switching terminals y.

Thus, the picture outputs from the left and right eye picture signal sources 14a and 14b are cut off and a convergence adjusting picture signal from the convergence adjusting picture signal source 16 is inputted in the green CRT projection tube 13G1, the red CRT projection tube 13R and the green CRT projection tube 13G2 through the switching elements 15a, 15b and 15c respectively.

Since the convergence adjusting picture signal from the convergence adjusting picture signal source 16 is supplied to the CRT projection tubes 13G1, 13R and 13G2 through the switching elements 15a, 15b and 15c respectively, beams from the three CRT projection tubes 13G1, 13R and 13G2 are projected on the screen 4 to display convergence adjusting pictures such as crosshatch patterns, for example.

If the beams from the three CRT projection tubes 13G1, 13R and 13G2 are simultaneously projected on the screen 4, however, the green convergence adjusting pictures which are formed by the beams from the two CRT projection tubes 13G1 and 13G2 are so difficult to distinguish that convergence adjustment cannot be readily performed. Therefore, a front part of either one of the two CRT projection tubes 13G1 and 13G2 is blocked by a mechanically inserted cap, or either one of the projection tubes 13G1 and 13G2 is brought into a cutoff state. In the latter case, the selector switch 15 may be formed by three-input one-output switching elements, so that one of the two CRT projection tubes 13G1 and 13G2 is supplied with a convergence adjusting picture signal while the other one is brought into an input cutoff state.

In this state, one of the two CRT projection tubes 13G1 and 13G2 which is subjected to actual picture display is so adjusted that crosshatch patterns of the green and red convergence adjusting pictures are superposed with each other, whereby convergence adjustment is easily enabled with no dispersion in accuracy depending on skillfulness, as compared with the case of superposing crosshatch patterns of the same color.

Actual convergence adjustment is performed by a method of forming a plurality of convergence waveforms in a polarization circuit (not shown) belonging to one of the green CRT projection tubes 13G1 and 13G2 which is subjected to picture display on the basis of horizontal triangular waveforms (or saw tooth waveforms) and horizontal parabola waveforms, or vertical triangular waveforms (or saw tooth waveforms) and vertical parabola waveforms, and waveform-synthesizing these convergence waveforms at proper ratios by a volume operation for applying the same to a sub-deflection yoke etc.

When convergence adjustment of one of the CRT projection tubes 13G1 and 13G2 which is subjected to actual picture display 18 completed on the basis of the red crosshatch pattern from the red CRT projection tube 13R, further convergence adjustment is performed on the other green CRT projection tube with reference to the same red crosshatch pattern from the red CRT projection tube 13R.

While the aforementioned convergence adjustment is performed without the polarizing glasses 5, alternative convergence adjustment can be performed by simultaneously projecting the beams from the three CRT projection tubes 13G1, 13R and 13G2 on the screen 4 when the left and right eye linear polarizing plates orthogonal to each other forming the polarizing glasses 5, are successively employed.

When the convergence adjustment of the left and right green CRT projection tubes 13G1 and 13G2 is completed, the aforementioned stereoscopic picture can be displayed anytime, so that a green stereoscopic picture can be displayed on the screen 4 by switching the selector switch 15 to the regular position as shown. In the stereoscopic picture display unit 11 according to this embodiment, a stereoscopic monochromatic picture can be observed by simply preparing practically two CRT projection tubes 13G1 and 13G2 of the same color as projection displays for a stereoscopic picture.

Due to provision of the CRT projection tube 13R for convergence adjustment in addition to those for stereoscopic picture display, convergence can be accurately adjusted in a short time while observing not superposition of crosshatch patterns of the same color, but superposition of crosshatch patterns of different colors.

Figure 2:
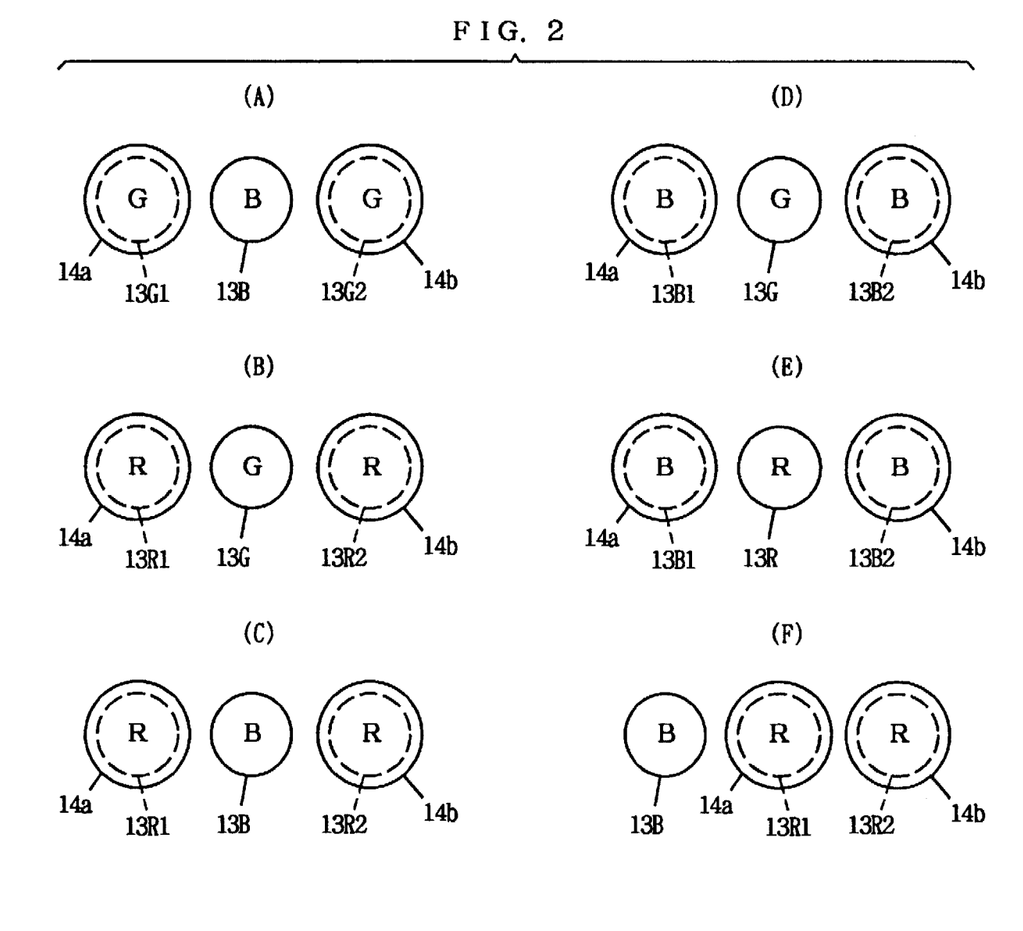
FIGS. 2(A) to 2(F) are schematic front elevational views showing modifications of a principal part of the unit shown in FIG. 1.

While the red CRT projection tube 13R is arranged between the left and right pair of green CRT projection tubes 13G1 and 13G2 in the aforementioned embodiment, the arrangement relation between two CRT projection tubes of the same color and one CRT projection tube for convergence adjustment is not restricted to this, but can be modified in various ways, as shown in FIG. 2.

Referring to FIG. 2(A), a blue CRT projection tube 13B is provided in place of the red CRT projection tube 13R for convergence adjustment which is employed in the aforementioned embodiment. On the other hand, the basic structure of the stereoscopic picture display unit of the present invention may be formed by providing red CRT projection tubes 13R1 and 13R2 as two stereoscopic picture display CRT projection tubes of the same color which are provided with polarizing filters 14a and 14b on the front surfaces thereof respectively while providing a green CRT projection tube 13G as an intermediate projection tube for convergence adjustment as shown in FIG. 2(B), or by providing a blue CRT projection tube 13B as that for convergence adjustment, as shown in FIG. 2(C).

Further, the stereoscopic picture display unit of the present invention may be provided with a left and right pair of blue CRT projection tubes 13B1 and 13B2 and a green CRT projection tube 13G serving as an intermediate CRT projection tube for convergence adjustment as shown in FIG. 2(D), or with a red CRT projection tube 13R for serving as a CRT projection tube for convergence adjustment as shown in FIG. 2(E). Alternatively, the CRT projection tube for conversion adjustment may be arranged not at an intermediate position between two stereoscopic picture display CRT projection tubes of the same color but on the right or left outer side of the two stereoscopic picture display CRT projection tubes. Referring to FIG. 2(F) showing such an example, a blue CRT projection tube 13B for convergence adjustment is arranged on the left outer side of two red CRT projection tubes 13R1 and 13R2 for stereoscopic picture display.

Figure 3:
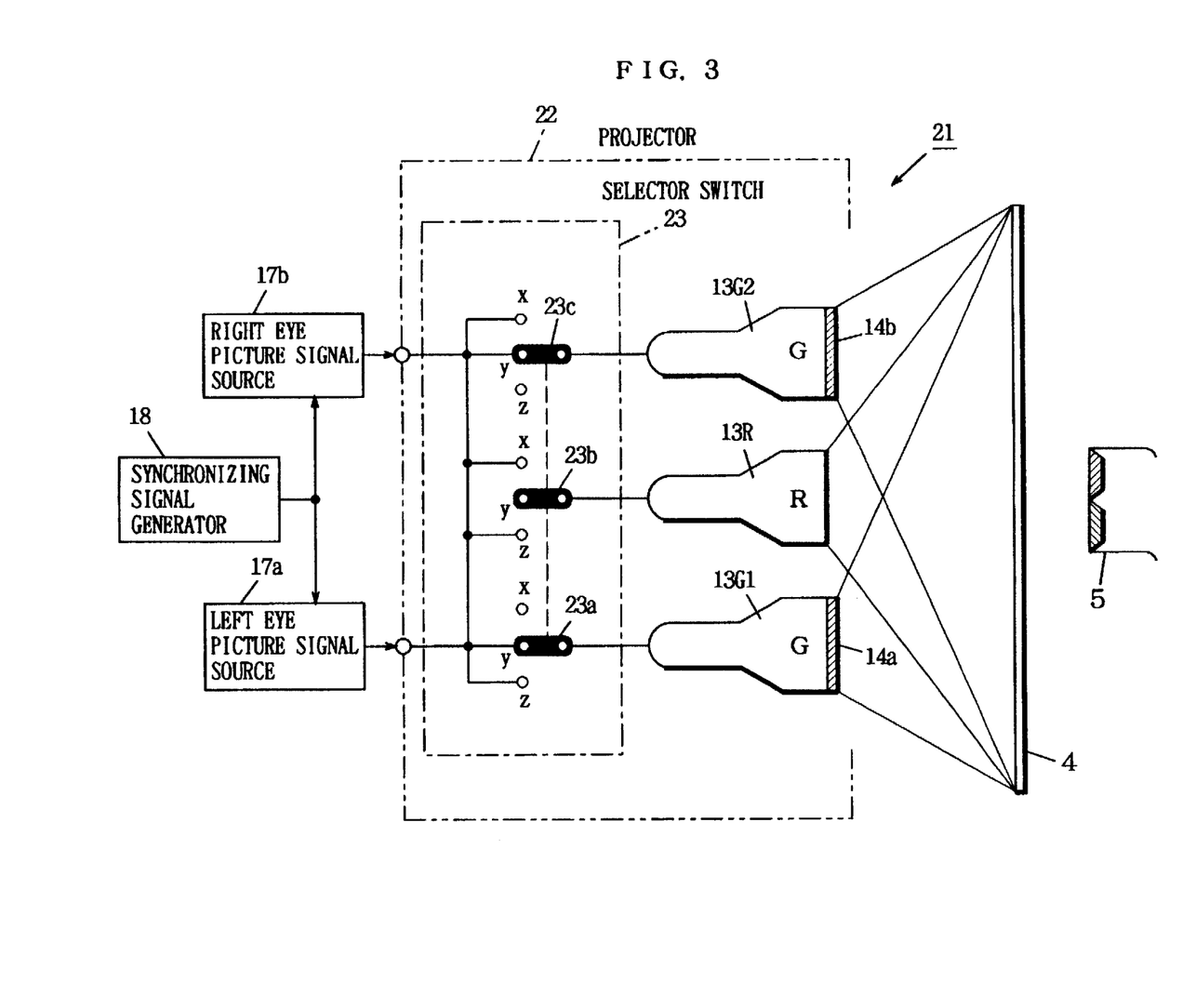
FIG. 3 is a schematic block diagram showing a unit according to another embodiment of the present invention.
Figure 4:
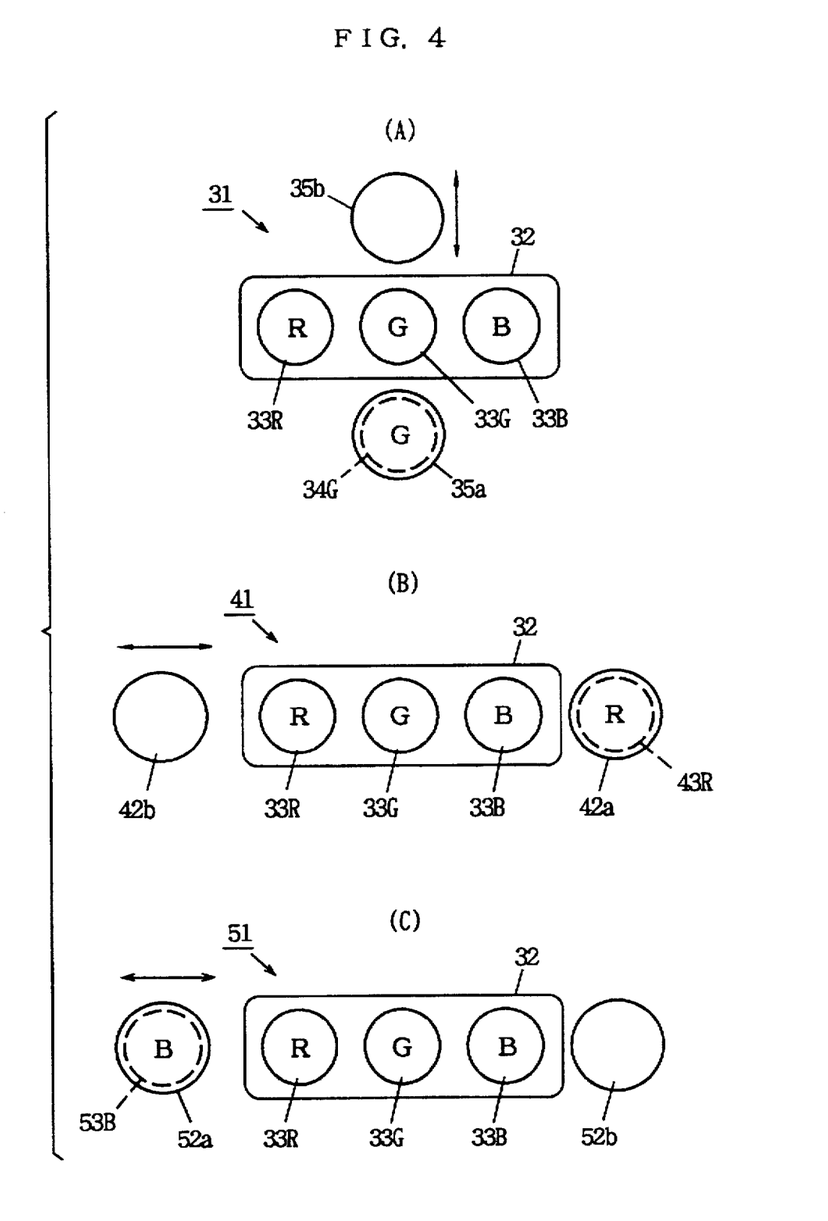
FIGS. 4(A) to 4(C) are schematic front elevational views showing principal parts of units according to further embodiments of the present invention.

Another embodiment of the present invention is now described. FIG. 3 is a block diagram showing a stereoscopic picture display unit according to this embodiment. Referring to FIG. 3, components which are identical to those shown in FIG. 1 are denoted by the same reference numerals, and redundant description is omitted. The stereoscopic picture display unit 21 according to this embodiment consists of a projector 22 and a screen 4, for displaying a stereoscopic monochromatic picture on the screen 4 with only one three-tube projector 22.

The projector 22 contains two green CRT projection tubes 13G1 and 13G2 for stereoscopic picture display, polarizing filters 14a and 14b which are arranged on the front surfaces thereof, a red CRT projection tube 13R for convergence adjustment which is arranged at the center, and a triple selector switch 23 consisting of three-input one-output switching elements 23a, 23b and 23c.

The triple selector switch 23 is formed by the switching elements 23a, 23b and 23c having common terminals which are connected to input terminals of the CRT projection tubes 13G1, 13R and 13G2 respectively. The switching element 23a has a switching terminal a null terminal, another switching terminal y which is connected to an output terminal of a left eye picture signal source 17a, and still another switching terminal z which is connected to an output terminal of a right eye picture signal source 17b with switching terminals x and z of the switching element 23b and switching terminals x and y of the switching element 23c. The switching terminals 23b and 23c have switching terminals y and z respectively, which are null terminals.

Thus, the projector 22 is provided with no convergence adjusting picture signal source according to this embodiment. Convergence adjustment is performed by inputting a right eye picture signal which is outputted from the right eye picture signal source 17b in the red CRT projection tube 13R and the green CRT projection tube 13G1 or 13G2 through the three-input one-output selector switch 23, as described later.

The operation of this embodiment is now described. When the switching elements 23a, 23b and 23c are at regular positions which are connected to the switching terminals y as shown in FIG. 3, the left and right eye picture signals are inputted in the green CRT projection tubes 13G1 and 13G2 respectively, for making stereoscopic picture display.

In convergence adjustment, on the other hand, each of the switching elements 23a, 23b and 23c is switched/connected to the switching terminals x or z. Assuming that the switching elements 23a, 23b and 23c are switched/connected to the switching terminals x respectively, the right eye picture signal which is outputted from the right eye picture signal source 17b is supplied to the red CRT projection tube 13R through the switching element 23b, as well as to the green CRT projection tube 13G2 through the switching element 23c.

At this time, a lattice-type crosshatch pattern, for example, which is suitable for convergence adjustment is supplied to the red CRT projection tube 13R and the green CRT projection tube 13G2, whereby red and green crosshatch patterns from the red CRT projection tube 13R and the green CRT projection tube 13G2 are projected/displayed on the screen 4. Therefore, convergence adjustment can be easily made in a simpler manner with no reduction in accuracy depending on skillfulness as compared with the case of superposing crosshatch patterns of the same color, by adjusting the CRT projection tube 13G2 so that the green crosshatch pattern is completely superposed with the red crosshatch pattern in all inspection points on the screen 4.

When the convergence adjustment of the green CRT projection tube 13G2 is completed on the basis of the red crosshatch pattern which is projected from the red CRT projection tube 13R, each of the switching elements 23a, 23b and 23c is switched/connected to the switching terminals z. Thus, the right eye picture signal which is outputted from the right eye picture signal source 17b is supplied to the red CRT projection tube 13R through the switching element 23b as well as to the green CRT projection tube 13G1 through the switching element 23a.

Also at this time, therefore, a lattice-type crosshatch pattern is supplied to the red CRT projection tube 13R and the green CRT projection tube 13G1 as the right eye picture signal, whereby convergence adjustment can be easily made in a simpler manner with no dispersion in accuracy depending on skillfulness as compared with the case of superposing crosshatch patterns of the same color, by adjusting the CRT projection tube 13G1 so that the green crosshatch pattern is completely superposed with the red crosshatch pattern in all inspection points on the screen 4.

While the right eye picture signal which is outputted from the right eye picture signal source 17b is employed for the convergence adjustment in the above description, connection of the selector switch 23 may alternatively be changed so that the left eye picture signal which is outputted from the left eye picture signal source 17a is employed, as a matter of course.

Also in this embodiment, the red CRT projection tube 13R for convergence adjustment is arranged between the left and right pair of green CRT projection tubes 13G1 and 13G2 similarly to the embodiment shown in FIG. 1. However, the arrangement relation between two CRT projection tubes of the same color and one CRT projection tube for convergence adjustment is not restricted to this, but can be modified in various ways, as shown in 2(A) to 2(F).

Further embodiments of the present invention are now described. FIGS. 4(A) to 4(C) are schematic front elevational views showing principal parts of stereoscopic picture display units according to further embodiments of the present invention. While the above embodiments have been described with reference to the display units 11 and 21 which are dedicated to stereoscopic monochromatic picture display, each of the following embodiments is adapted to enable two-dimensional color picture display in addition to stereoscopic monochromatic picture display, by adding a CRT projection tube which is provided with a polarizing filter of an arbitrary one of the three primary colors to an existent color projector consisting of three CRT projection tubes of the primary colors of red (R), green (G) and blue (B), and supplying left and right picture signals to the added CRT projection tube and that of the same color as this projection tube.

In the stereoscopic picture display unit 31 shown FIG. 4(A), a green CRT projection tube 34G which is provided with a polarizing filter 35a on its front surface is added to a position under (or above) a preen CRT projection tube 33G of an existent color projector 32 consisting of three CRT projection tubes 33R, 33G and 33B of red (R), green (G) and blue (B), while a polarizing filter 35b which is mountable on or slidable along the front surface of the green CRT projection tube 33G is provided above (or under) the green CRT projection tube 33. The polarizing filters 35a and 35b are formed by linear polarizing plates which are orthogonal to each other.

In the stereoscopic picture display unit 41 shown in FIG. 4(B), on the other hand, a red CRT projection tube 43R which is provided with a polarizing filter 42a on its front surface is added to a position which is adjacent to a blue CRT projection tube 33B of an existent color projector 32, while a polarizing filter 42b which is mountable on or slidable along the front surface of a red CRT projection tube 33R is provided adjacently to the red CRT projection tube 33R. The polarizing filters 42a and 42b are formed by linear polarizing plates which are orthogonal to each other.

In the stereoscopic picture display unit 51 shown in FIG. 4(C), further, a blue CRT projection tube 53B which is provided with a polarizing filter 52a on its front surface is added to a position which is adjacent to a red CRT projection tube 33R of an existent color projector 32, while a polarizing filter 52b which is mountable on or slidable along a front surface of a blue CRT projection tube 33B is provided adjacently to the blue CRT projection tube 33B. The polarizing filter 52a and 52b are formed by linear polarizing plates which are orthogonal to each other.

All of these stereoscopic picture display units 31, 41 and 51 can display stereoscopic monochromatic pictures by supplying right and left eye picture signals to the CRT projection tubes 34G, 43R and 53B which are provided with the polarizing filters 35a, 42a and 52a on the front surfaces thereof and CRT projection tubes 33G, 33R and 33B of the same colors as the tubes 34G, 43R and .53B while mounting the polarizing filters 35b, 42b and 52b on the front surfaces of the CRT projection tubes 33G, 33R and 33B respectively.

Further, these stereoscopic picture display units 31, 41 and 51 can perform convergence adjustment by successively using the CRT projection tubes 34G, 43R and 53B and two CRT projection tubes of the color projectors 32 emitting beams of different hues. In addition, the stereoscopic picture display units 31, 41 and 51 can also display two-dimensional color pictures by using only the color projectors 32. Thus, every one of the stereoscopic picture display units 31, 41 and 51 can arbitrarily selectively realize stereoscopic monochromatic picture display and two-dimensional color picture display.

Figure 5:
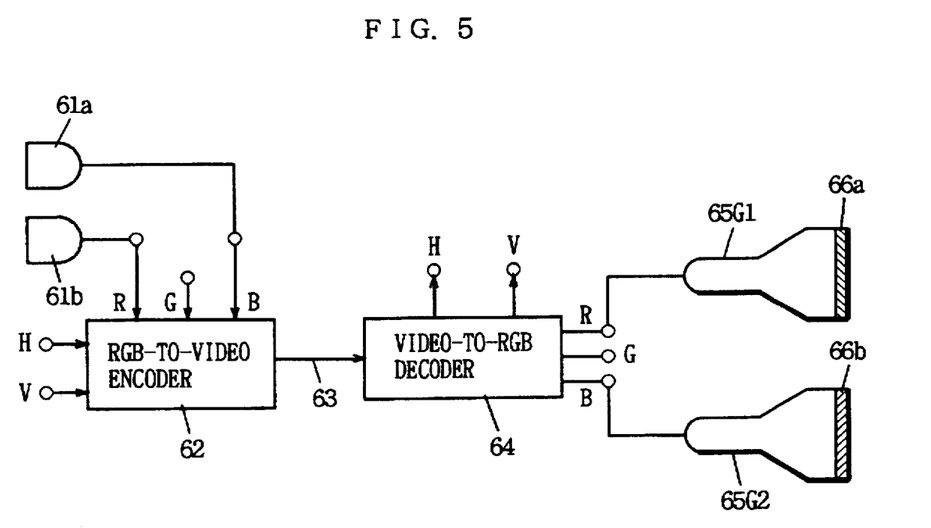
FIG. 5 illustrates exemplary connection of a decoder which is suitable for the present invention.

FIG. 5 shows exemplary connection of a decoder which is suitable for the stereoscopic picture display unit according to the present invention. While every one of the aforementioned embodiments is in a component output structure which is supplied with picture signals of the three primary colors R, G and B and horizontal and vertical synchronizing signals independently of each other, the structure shown in FIG. 5 is of a composite output type.

Referring to FIG. 5, left and right eye picture signals formed by two black-and-white television cameras 61a and 61b which are arranged with binocular parallax are supplied to B and R signal input terminals of an RGB-to-video encoder 62 as B and R signals respectively, and converted to a composite picture signal with addition of external horizontal and vertical synchronizing signals H and V.

This composite picture signal is supplied to a video-to-RGB decoder 64 through a single video cable 63 to be decoded to the primary color signals again, separated into the horizontal and vertical synchronizing signals H and V, and outputted to the exterior. R and B signal output terminals of the video-to-RGB decoder 64 are connected to input terminals of first and second green CRT projection tubes 62G1 and 62G2 respectively.

Further, polarizing filters 66a and 66b consisting of linear polarizing plates polarizing in directions orthogonal to each other are mounted on the front surfaces of the green CRT projection tubes 65G1 and 65G2 respectively. Thus, the left and right picture signals formed by the two black-and-white television cameras 61b and 61a are inputted in the green CRT projection tubes 65G1 and 65G2 respectively, whereby right and left eye pictures are projected/displayed on a screen (not shown) through the polarizing filters 66a and 66b respectively.

According to this example of connection, as hereinabove described, a green stereoscopic picture can be displayed also in a projector having only composite picture signal input terminals by connecting the input terminals of the CRT projection tubes 65G1 and 65G2 to the R and B signal output terminals of the video-to-RBG decoder 64 among those of the same hue (green in this case) provided with the polarizing filters 66a and 66b on the front surfaces thereof.

The present invention is not restricted to the aforementioned embodiments. While the polarizing filters 14a, 14b, 35a, 35b, 42a, 42b, 52a, 52b, 66a and 66b are illustrated as linear polarizing plates in the above embodiments, for example, such polarizing plates can alternatively be formed by dextrorotatory and levorotatory circular polarizing plates of opposite rotatory directions. In this case, the polarizing glasses 5 must also be formed by circular polarizing plates of opposite rotatory directions for the right and left eyes.

The circular polarizing plates themselves are easy to obtain since they can be formed by combining linear polarizing plates with quarter-wave plates and are commercially available as single components. Circular polarizing plate type polarizing filters cause no crosstalk of doubling right and left pictures upon horizontal inclination of the polarizing glasses, although the cost therefor is slightly higher than that for linear polarizing plate type polarizing filters.

While the projection units are formed by CRT projection tubes in each of the aforementioned embodiments, the same are not restricted to the CRT projection tubes but can alternatively be formed by projection type liquid crystal panels or the like, for example. Although each projection unit projects any one of the three primary colors on the screen in each of the aforementioned embodiments, further, the present invention is not restricted to this but a color other than the three primary colors may alternatively be projected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A stereoscopic picture display unit comprising:

first and second projection units emitting beams of light of the same hue in response to input picture signals respectively;

a third projection unit being aligned with said first and second projection units for emitting a beam of a hue being different from that of beams being emitted from said first and second projection units in response to an input picture signal;

first and second polarizing filters, comprising linear polarizing plates polarizing in directions orthogonal to each other or circular polarizing plates rotating in opposite directions from each other, being mounted on front surfaces of said first and second projection units respectively;

a screen receiving the beams being projected from said first to third projection units for displaying a picture; and a selector switch for supplying in a first operational mode one of said first and second projection units with a left eye picture signal and supplying the other with a right eye picture signal in a stereoscopic picture display, and supplying in a second operational mode at least one of said first and second projection units and said third projection unit with a convergence adjusting picture signal in convergence adjustment.

2. The stereoscopic picture display unit in accordance with claim 1, further comprising a convergence adjusting picture signal source for generating convergence adjusting picture signals being supplied to each of at least one of said first and second projection units and said third projection unit through said selector switch in convergence adjustment.

3. The stereoscopic picture display unit in accordance with claim 1, wherein said selector switch is a three-input one-output selector switch for supplying a left and right eye picture signal being supplied to one of said first and second projection units in convergence adjustment to said first and third projection units, and thereafter switching to input the signal to said second and third projection units.

4. The Stereoscopic picture display unit in accordance with claim 1, wherein a color projector comprising three color projection units for projecting color pictures onto said screen is so provided that said first polarizing filter is formed to be detachable or slidable on a front surface of a projection unit of a predetermined color among the three color projection units of the color projector as said first projection unit, said second polarizing filter is mounted on a front surface of a projection unit of the same color as the projection unit of the predetermined color, being arranged to be adjacent to said color projector as said second projection unit, and any one of the projection units of two colors other than the projection unit of the predetermined color among the three color projection units of said color projector is employed as said third projection unit.

* * * * *